US012629705B2

(12) United States Patent
Luisi et al.

(10) Patent No.: US 12,629,705 B2
(45) Date of Patent: May 19, 2026

(54) METHOD FOR PRODUCING A DISTRIBUTION WALL

(71) Applicant: APTAR FRANCE SAS, Le Neubourg (FR)

(72) Inventors: Bénédicte Luisi, Evreux (FR); Julien Jeannin, Saint Jorioz (FR)

(73) Assignee: APTAR FRANCE SAS, Le Neubourg (FR)

( * ) Notice: Subject to any disclaimer, the term of this patent is extended or adjusted under 35 U.S.C. 154(b) by 498 days.

(21) Appl. No.: 17/778,480

(22) PCT Filed: Nov. 22, 2019

(86) PCT No.: PCT/FR2019/052782
§ 371 (c)(1),
(2) Date: May 20, 2022

(87) PCT Pub. No.: WO2021/099696
PCT Pub. Date: May 27, 2021

(65) Prior Publication Data
US 2022/0410185 A1     Dec. 29, 2022

(51) Int. Cl.
*B05B 1/18* (2006.01)
*B29C 45/00* (2006.01)
*B29C 69/00* (2006.01)

(52) U.S. Cl.
CPC .......... *B05B 1/185* (2013.01); *B29C 45/0055* (2013.01); *B29C 69/001* (2013.01)

(58) Field of Classification Search
CPC ....... B05B 1/14; B05B 1/02–22; B05B 1/185; B29C 2045/0094; B29C 45/0046;
(Continued)

(56) References Cited

U.S. PATENT DOCUMENTS

| | | | | |
|---|---|---|---|---|
| 6,758,422 B2 * | 7/2004 | Kuo | ........................ | B05B 1/185 |
| | | | | 239/602 |
| 2006/0213408 A1 * | 9/2006 | Christ | .................... | B65D 83/28 |
| | | | | 111/200 |

(Continued)

FOREIGN PATENT DOCUMENTS

| | | |
|---|---|---|
| EP | 1698399 A1 | 9/2006 |
| EP | 1878507 A2 | 1/2008 |

(Continued)

OTHER PUBLICATIONS

International Search Report of PCT/FR2019/052782 dated Jul. 28, 2020 [PCT/ISA/210].

(Continued)

*Primary Examiner* — Steven M Cernoch
*Assistant Examiner* — Juan C Barrera
(74) *Attorney, Agent, or Firm* — Sughrue Mion, PLLC

(57) ABSTRACT

Method for producing a spray wall drilled with a network of holes for the pressurised fluid substance to pass through so as to be sprayed in fine droplets. The method includes the steps of (a) moulding a nozzle having a front wall integrally formed with an assembly wall, the assembly wall surrounding the front wall, the front wall having a curved initial configuration upon removal from the mould; (b) drilling the curved front wall with a network of holes having a defined initial orientation; and (c) deforming the drilled curved front wall into a final spray configuration defining a spray wall, the defined initial orientation of the holes being subsequently modified.

12 Claims, 3 Drawing Sheets

Figure 1:
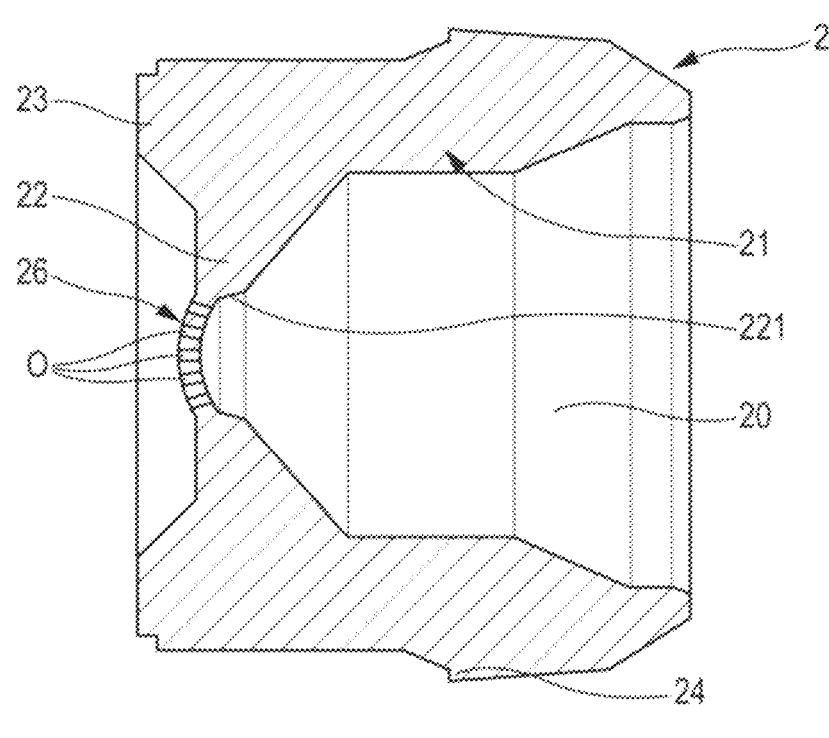

(58) Field of Classification Search
CPC ................ B29C 69/001; B29C 45/263; B29C
2045/2648; B29C 2045/2655; B29C
33/0033; B29C 35/0222; B29C 35/0233;
B29C 2045/538; B29C 45/57; B29C
45/572; B29C 53/04; B29C 59/02; B29C
67/0011; B29C 45/0053; B29C 45/0055;
B29C 2793/0045; B29C 53/16; B29C
53/18; Y10T 29/49432–49433; Y10T
29/49989; Y10T 29/49991; B23P 23/04;
B23P 15/12; F15B 5/003
USPC .......................................... 239/533.1, 533.14
See application file for complete search history.

(56) References Cited

U.S. PATENT DOCUMENTS

| | | | | |
|---|---|---|---|---|
| 2014/0231540 A1* | 8/2014 | Greiner-Perth | ........... | B05B 1/18 239/102.2 |
| 2019/0157218 A1* | 5/2019 | Jackl | ................. | H01L 23/49827 |

FOREIGN PATENT DOCUMENTS

| | | | | | |
|---|---|---|---|---|---|
| FR | 2772010 | A1 | 6/1999 | | |
| JP | 11-076871 | A | 3/1999 | | |
| WO | WO-2018100321 | A1 * | 6/2018 | .............. | B05B 1/14 |
| WO | 2019/106315 | A1 | 6/2019 | | |
| WO | 2019/106319 | A1 | 6/2019 | | |
| WO | 2019/106321 | A1 | 6/2019 | | |
| WO | 2019/106323 | A1 | 6/2019 | | |

OTHER PUBLICATIONS

International Preliminary Report on Patentability issued May 27, 2022 in International Application No. PCT/FR2019/052782.

* cited by examiner

METHOD FOR PRODUCING A DISTRIBUTION WALL

CROSS REFERENCE TO RELATED APPLICATIONS

This application is a National Stage of International Application No. PCT/FR2019/052782 filed on Nov. 22, 2019.

The present invention relates to a spray wall for a fluid dispenser head for associating with a dispenser member, such as a pump or a valve. The dispenser head may be integrated in, or mounted on, the dispenser member. The dispenser head may include a bearing surface such that it constitutes a pusher on which the user presses so as to actuate the dispenser member. In a variant, the dispenser head need not have a bearing surface. This type of fluid dispenser head is frequently used in the fields of perfumery, cosmetics, or even pharmacy.

A conventional dispenser head, e.g. of the pusher type, comprises:

- a bearing surface on which a user can press with a finger, e.g. the index finger,
- an inlet well for connecting to an outlet of a dispenser member, such as a pump or a valve,
- an axial assembly housing in which there extends a pin defining a side wall and a front wall, and
- a cup-shaped nozzle comprising a substantially-cylindrical assembly wall having an end that is closed by a spray wall that forms a spray orifice, the nozzle being assembled along an axis X in the axial assembly housing, with its cylindrical wall engaged around the pin, and its spray wall in axial abutment against the front wall of the pin.

In general, the inlet well is connected to the axial assembly housing via a single feed duct. In addition, it is common to form a swirl system in the spray wall of the nozzle. A swirl system conventionally comprises a plurality of tangential swirl channels that open out into a swirl chamber that is centered on the spray orifice of the nozzle. The swirl system is disposed upstream from the spray orifice.

Document EP 1 878 507 A2 describes several embodiments of a nozzle including a spray wall that is drilled with a plurality of spray holes that are substantially or completely identical in diameter, lying in the range about 1 micrometer (µm) to about 100 µm, with a tolerance of 20%. Such a spray wall generates a spray having a droplet size that is relatively uniform. In an embodiment of that document, the wall is of curved shape and the holes thus diverge. However, the cone angle of the spray remains small.

In document EP 1 698 399 A1, the spray wall is of thickness that is constant, but of curved shape. The holes are drilled perpendicularly to the plane of the wall, while the wall is still plane. Once the shape of the wall has been curved, the curvature of the wall serves to make the holes diverge. It should be understood that after the wall has been curved, the holes present sections that are constant over their entire length. In that document, it is not explained how, nor at what moment, the shape of the drilled plane wall is curved. In the drawings, the curvature of the curved shape is small, such that the cone angle of the spray is small.

In document WO 2019/106 315 A1, the spray wall is made from a strip of stainless steel which is folded, drilled and then folded in the other direction, before being cut out and then integrated into a nozzle. Unfortunately, this theoretical method cannot be industrialised at lower cost.

An object of the present invention is to improve the manufacturing method of document WO 2019/106 315 A1, so that it can be readily industrialized.

To achieve this object, the present invention proposes a method of manufacturing a spray wall that is drilled with a network of holes through which the fluid under pressure passes so as to be sprayed in small droplets, the method comprising the following steps:

- a—moulding a nozzle comprising a front wall and a assembly wall integrally formed, the assembly wall surrounding the front wall, the front wall having an curved, concave or convex initial configuration upon removal from the mould,
- b—drilling the curved front wall with a network of holes having a defined initial orientation,
- c—deforming the drilled curved front wall into a final spray configuration defining a spray wall, the defined initial orientation of the holes being subsequently modified.

With respect to the manufacturing method of document WO 2019/106 315 A1, it should be noted that the method of the present invention:

- starts with a wall that is moulded in a curved configuration, so no initial deformation,
- removes the cutting and assembly step, since the wall is made integrally and is integrated with the nozzle,
- makes it easier the drilling and deformation steps, given that the assembly wall can be used as a gripping or reference member.

Advantageously, the front wall and the integrally assembly wall are made of a suitable moldable, deformable and drillable material, such as a plastics material, a metal, etc.

In step b—, the defined initial orientation of the holes is preferably parallel. However, it is also possible, in certain cases, to envisage drilling non-parallel holes, for example holes that already diverge. By way of example, it is possible to provide two distinct series of holes, the holes of a series being so parallel, but the holes of the two series having different orientations.

In step b—, the holes are preferably drilled simultaneously, advantageously by means of a divided laser beam. More precisely, a base laser beam is divided by appropriate means to form partial laser beams (identical or different) which will simultaneously impinge the curved front wall. The partial laser beams are preferably parallel, but they may also diverge.

Advantageously, step b— comprises drilling 10 to 500 holes having diameters lying in the range about 1 µm to about 100 µm, advantageously in the range about 5 µm to about 30 µm, and preferably in the range about 5 µm to about 20 µm.

According to a first preferred embodiment, in step c—, the deformation of the drilled curved (concave or convex) front wall is permanent, achieved by means of a movable pin that comes into contact with the drilled curved front wall in order to push it into the final spray configuration. Preferably, the movable pin and/or the drilled curved front wall are hot at the time of their mutual contact.

As a variant, in step c—, the deformation of the drilled curved front wall is elastic and reversible, for example obtained temporarily by the pressurised fluid which impinges the drilled curved front wall in order to bring it into the final spray configuration (planar or curved in the opposite direction), and then returns to its initial curved configuration.

According to an embodiment, the final spray configuration of the spray wall is substantially plane. However, the final spray configuration of the spray wall is preferably curved inversely with respect to the front wall.

The present invention also defines a nozzle comprising a spray wall and a assembly wall integrally formed, the assembly wall surrounding the spray wall, the spray wall being obtained from an initially curved front wall, which has been drilled with a network of holes, and then deformed into a final spray configuration defining a spray wall, the defined initial orientation of the holes being thus modified, wherein the spray wall may present a thickness lying in the range about 0.01 mm to about 1 mm, advantageously in the range about 0.05 mm to about 0.2 mm. On the other hand, the spray wall may have a diameter lying in the range about 0.3 mm to about 2 mm, advantageously in the range about 0.6 mm to about 1 mm. The spray wall may be drilled with 10 to about 500 holes having diameters lying in the range about 1 μm to about 100 μm, advantageously in the range about 5 μm to about 30 μm, and preferably in the range about 5 μm to about 20 μm.

In a very advantageous aspect, the assembly wall may comprise a solid crown which is directly connected to and surrounds the spray wall, this solid crown having a minimum thickness corresponding to at least twice the thickness of the spray wall, this solid crown advantageously having a frustoconical shape in the direction of the spray wall. This solid crown is particularly advantageous during moulding. Specifically, the material sets very quickly on contact with the cavity of the mould. By having a large and hot volume of plastics material as close as possible to the front wall, which constitutes a zone of small thickness, a heat reservoir is created which makes it possible to fill this zone. Splicing is inevitable when a pin is turned around, however when the two edges of materials which meet are at a temperature close to the transformation temperature, then this line is not or is not very visible. In the case of the moulding of a nozzle, the region of the front wall is the last to be filled because it has a small thickness, which constitutes a barrier to the flow of the material, because in contact with the steel of the mould which cools it: if it is frozen, the cavity is no longer filled. Consequently, the less surface there is in contact with the steel (at the time of the end of filling), the more the material will retain its heat, and therefore its fluidity, and the filling will be improved.

According to another advantageous characteristic, the assembly wall comprises an annular bearing rim that extends around the spray wall, the spray wall being disposed recessed from this annular bearing rim, so as not to damage the spray wall during mounting of the nozzle by bearing on the annular bearing rim. In other words, the spray wall is housed at the bottom of a dish which is flanked in a projecting manner by the annular bearing rim. Thus, and very particularly when the spray wall is curved outwards, any risk of breaking it or of damaging it during the mounting of the nozzle is eliminated.

The invention also defines a fluid dispenser head provided with an assembly housing, a nozzle, made in accordance with any one of the preceding claims, being inserted into the assembly housing. The housing may also accommodate other parts, e.g. one or more filters.

The spirit of the invention resides in deforming a curved, non-planar front wall that comes from moulding integrally in a nozzle. Once the holes have been drilled, subsequent flattening or inverse rounding, causes the holes to diverge or converge, as a function of the side under consideration. It is even possible to envisage using the method of the invention to create a spray wall having converging jets, so as to create a phenomenon of dispersion by collision.

Figure 2:
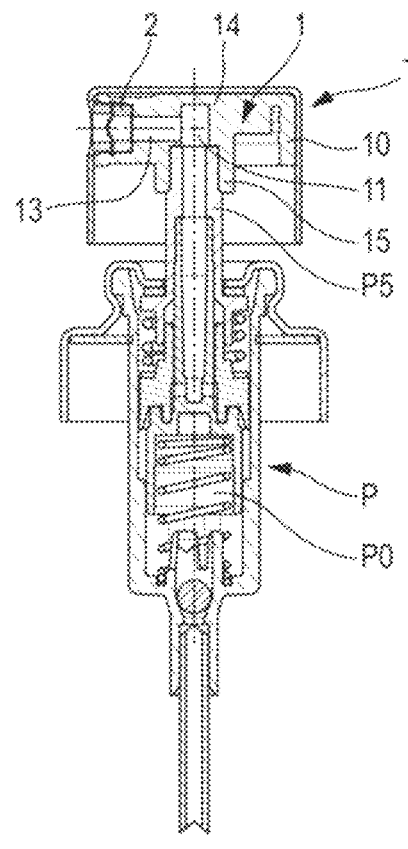
Figure 3:
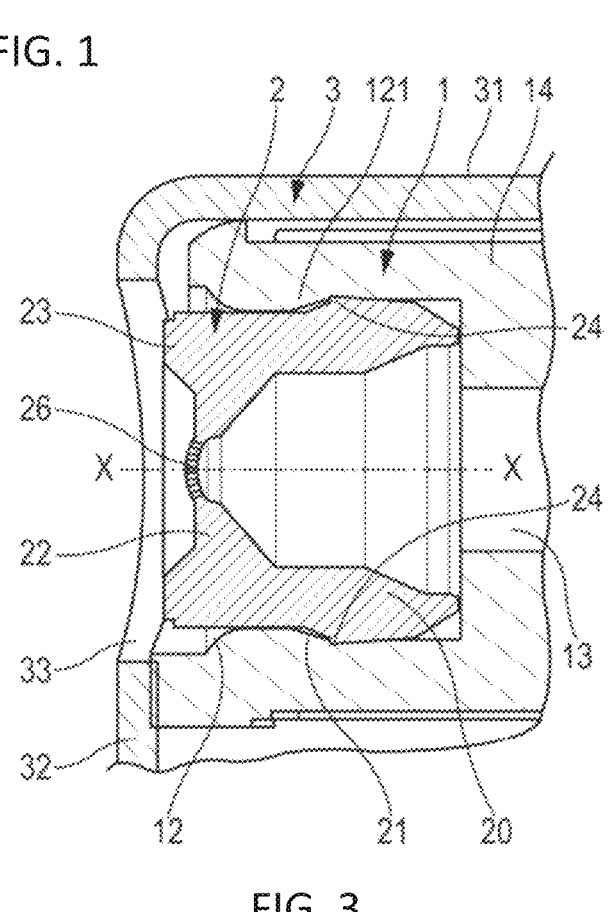

The invention will now be described in more detail with reference to the accompanying drawings, which show several embodiments of the invention as non-limiting examples. in the Figures:

FIG. 1 is a vertical cross-section view through a nozzle according to a first embodiment of the invention, FIG. 2 is a vertical cross-section view through a pump fitted with a dispenser head incorporating the nozzle of FIG. 1, FIG. 3 is a larger-scale view of a portion of the dispenser head of FIG. 2 incorporating the nozzle of FIG. 1, FIGS. 4a to 4d are cross-section larger-scale views that seek to illustrate the method of manufacturing the spray wall of the nozzle of FIGS. 1 to 3, and FIGS. 5 to 8 are cross-section larger-scale views of alternative embodiments of the nozzle according to the invention.

The nozzle 2 presents a conventional overall configuration in the form of a small cup comprising a substantially cylindrical assembly wall 21 and a spray wall 26. These two walls 21 and 26 are integrally formed by moulding/injection of plastics material. The spray wall 26 and at least one adjacent part of the assembly wall 21 are made of the same material.

An internal chamber 20 is formed in the nozzle: in operation, the pressurised fluid fills this internal chamber 20 before passing through the holes O of the spray wall 26 to be sprayed in the form of small droplets, which can be described as a spray. The spray wall 26 is drilled from 10 to 500 holes or orifices O having diameters lying in the range from 1 μm to 100 μm, advantageously in the range from 5 μm to 30 μm, and preferably in the range from 5 μm to 20 μm. The spray wall 26 is curved outwards: it can also be said that it is of convex shape. The holes O pass through this convex curved wall with divergent orientations, so as to form an open-angle spray. The spray wall 26 has a constant wall thickness lying in the range from 0.01 mm to 1 mm, advantageously in the range from 0.05 mm to 0.2 mm. On the other hand, the spray wall has a diameter lying in the range from 0.3 mm to 2 mm, advantageously in the range from 0.6 mm to 1 mm.

The holes O may be arranged in concentric circles and present diameters that are identical, or, on the contrary, diameters that are different, the diameter of the holes of the outer circle might be greater or smaller than the diameter of the holes of the inner circle.

The assembly wall 21 surrounds the spray wall 26 and is connected to it at a solid crown 22, the volume of which is much greater than that of the spray wall 26. It can also be said that the minimum thickness of the crown 22 corresponds to more than twice, or even three times, the thickness of the spray wall 26. The crown 22 advantageously has a frustoconical cross-section towards the spray wall 26. Preferably, the crown 22 forms a small annular centering chamfer 221 upstream from the spray wall 26, the function of which will be explained below. This solid crown 22 (with respect to the spray wall 26) has the function of serving as a reservoir of hot material, during the moulding of the nozzle, to form the spray wall 26. This is why the solid crown 22 is directly connected to the spray wall 26, with a thickness much greater than that of the spray wall 26.

The assembly wall 21 also comprises an annular bearing rim 23 which is disposed around the spray wall 26, or more precisely around the solid crown 22. This annular bearing rim 23 projects forwardly with respect to the spray wall 26 and the outer face of the solid crown 22. In other words, the spray wall 26 is recessed from this annular bearing rim 23.

Thus, a plane surface which comes into contact with the annular bearing rim 23 remains out of contact with the spray wall 26. It is therefore possible to press on this annular bearing rim 23 without risking damaging the spray wall 26, which is still fragile because of its small thickness.

The assembly wall 21 is also provided on the outside with projecting fastener portions 24.

In FIG. 2, a dispenser head T is mounted on a dispenser member P, such as a pump or a valve, that presents a design that is entirely conventional in the fields of perfumery and pharmacy. The dispenser member P is actuated by the user pressing axially on the head T with a finger, in general the index finger.

For a pump, the normal pressure generated by pressing axially on the fluid inside the pump P and the head T lies in the range about 5 bars to about 6 bars, and preferably in the range about 5.5 bars to about 6 bars. Peaks lying in the range 7 bars to 8 bars are nevertheless possible, but in conditions of use that are abnormal. Conversely, when approaching 2.5 bars, the spray is degraded, in the range 2.5 bars to 2.2 bars the spray is significantly degraded, and below 2 bars there is no longer any spray.

For an aerosol fitted with a valve, the initial pressure generated by the propellant gas lies in the range about 12 bars to about 13 bars and then drops to approximately 6 bars as the aerosol empties. An initial pressure of 10 bars is common in the fields of perfumery and cosmetics.

When the assembly comprising the head T and a pump or valve is mounted on a fluid reservoir, the resulting fluid dispenser is entirely manual, without requiring any supply of power, in particular of electrical power.

In comparison, in the technical field of ultrasonic-vibration spray devices (in particular piezoelectric spray devices), the pressure of the fluid at the nozzle is about 1 bar, i.e. atmospheric pressure, or a little less. Given the pressure values and the power used by such ultrasonic-vibration spray devices, they lie outside the scope of the invention.

The dispenser head T comprises a head body 1, on which the nozzle 2 is mounted. The head body 1 may be made by injection moulding a plastics material. The head body 1 is preferably made as a single part: however, it could be made from a plurality of parts that are assembled together.

The head body 1 includes a substantially-cylindrical peripheral skirt 10 that is closed at its top end by a disk 14. The head body 1 also includes a connection sleeve 15 that, in this embodiment, extends in coaxial manner inside the peripheral skirt 10. The connection sleeve 15 extends downwards from the disk 14. The inside of the connection sleeve defines an inlet well 11 that is open at its bottom end, and that is closed at its top end by the disk 14. The connection sleeve 15 is for mounting on the free end of an actuator rod P5 of the dispenser member P. The actuator rod P5 is movable downwards and upwards along a longitudinal axis. The actuator rod P5 is hollow so as to define a flow duct that is in communication with a metering chamber P0 of the pump P or the valve. The inlet well 11 extends upwards, extending the actuator rod P5 so that the fluid coming from the metering chamber P0 can flow into the inlet well 11. The head body 1 also defines a feed duct 13 that connects the inlet well 11 to an assembly housing 12, as can be seen in FIG. 2. The axial assembly housing 12 is of generally cylindrical configuration, thereby defining an inside wall that is substantially cylindrical. The feed duct 13 opens out into the assembly housing 12 in central manner. It should also be observed that the inside wall of the assembly housing 12 presents fastener profiles 121 enabling the nozzle 2 to be held more securely, as described below.

Optionally, the head body 1 may be engaged in a cover 3 that comprises a top bearing surface 31 on which a finger can press, and a side casing 32 that forms a side opening 33 through which the nozzle 2 can pass.

The nozzle 2, previously described, is engaged in the assembly housing 12 of the head body 1 along the axis X. In the final assembly position shown in FIG. 3, the nozzle abuts against the bottom of the assembly housing 12 and the annular bearing rim 23 is disposed substantially at the lateral opening 33. The projecting fastener portions 24 are in engagement with the fastener profiles 121.

Reference is made below to FIGS. 4*a* to 4*d* in order to describe the method of manufacturing the nozzle 2.

Firstly, a nozzle blank 2*a* is moulded that includes an assembly wall 21 that is identical to that described above and a front wall 26*a* that is concave from the outside or that is curved towards the inside of the chamber 20. The front wall is solid, i.e. without a hole.

Figure 4A:
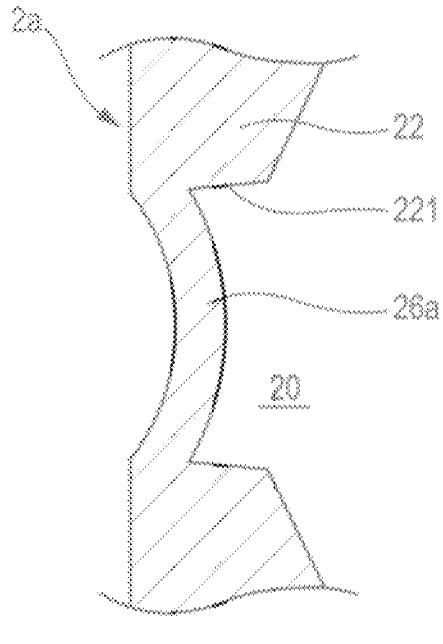
Figure 4B:
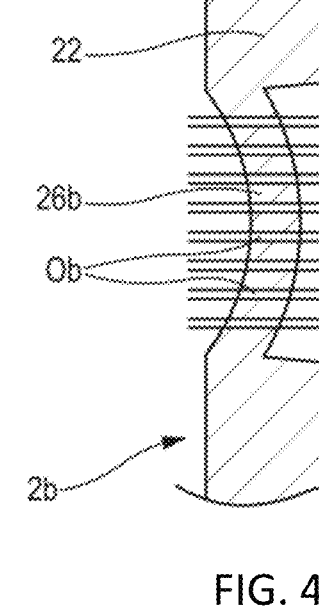
Figure 4C:
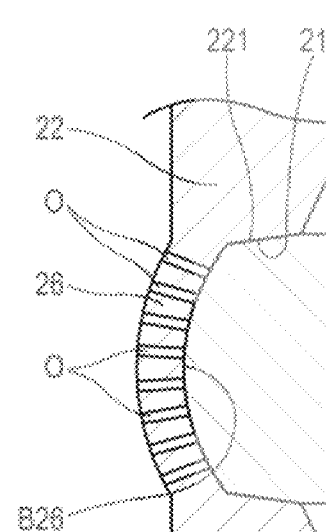

The next step consists in perforating, e.g. by means of a laser, parallel holes Ob in the front wall 26*a* so as to obtain a drilled curved or concave front wall 26*b*. This is shown in FIGS. 4*b* and 4*c*. The holes Ob situated at the center of the drilled front wall 26*b* are substantially perpendicular to the normal, while the holes that are made further away from the center are progressively less perpendicular thereto. In practice, the holes Ob are preferably drilled simultaneously, advantageously by means of a divided laser beam. More precisely, a basic laser beam is divided by appropriate means M to form partial laser beams Lp (identical or different) which will simultaneously impinge the curved front wall 26*a*. The partial laser beams Lp are preferably parallel, but they may also diverge.

Figure 4D:
Figure 4D:

During a next step, the drilled concave front wall 26*b* is deformed by means of a mobile pin B which is axially introduced into the chamber 20. This can be seen in FIG. 4*c*. This pin B comprises a convex thrust wall B26. The thrust wall B26 is surrounded by a frustoconical section B21 intended to come into engagement with the annular centering chamber 221 in order to center the pin B and limit its axial movement with respect to the nozzle 2. During its axial movement, the pin B will first come into contact with the center of the drilled concave front wall 26*b*, as can be understood from FIG. 4*c*. The thrust wall B26 will thus deform the drilled concave front wall 26*b* to bring it into the final convex or outwardly curved configuration, as can be seen in FIG. 4*d*. The spray wall 26 of the invention is then formed. It may be noted that the frustoconical section B21 abuts against the annular centering chamfer 221. Above all, it should be noted that the holes O diverge, while the holes Ob were parallel. This change in orientation is easily explained by the deformation of the drilled front wall 26*b*, which was concave, to pass to a convex spray wall.

In the above-described embodiment, the front wall 26*a* has a constant wall thickness and is curved so as to form a rounded dome. The spray wall 26 is curved in the other direction definitively and permanently. FIGS. 5 to 8 show variant embodiments.

Figure 5:
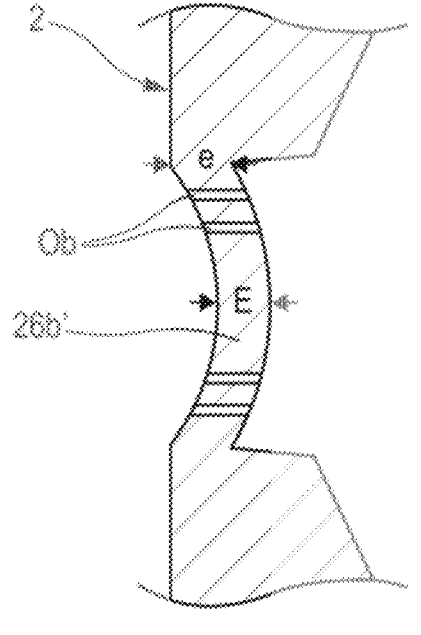

In FIG. 5, the drilled front wall 26*b*' has a variable wall thickness: the thickness E at the center being greater than the thickness e at the periphery. The holes Ob are only arranged at the periphery, and not at the center, so as to have holes O that diverge highly.

Figure 6:
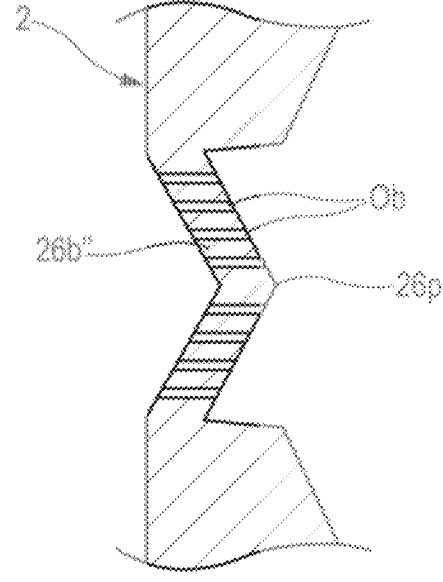

In FIG. 6, the drilled front wall 26*b*" has a cone shape with a tip 26*p*. This cone will be rolled up or flattened during the deformation step.

Figure 7:
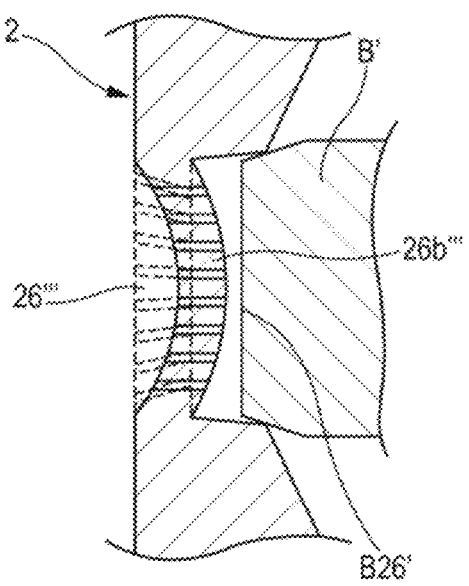

In FIG. 7, the drilled front wall 26*b*''' is deformed by a pin B' having a plane thrust wall B26', so as to obtain a plane spray wall 26''', indicated by dashed lines.

Figure 8:
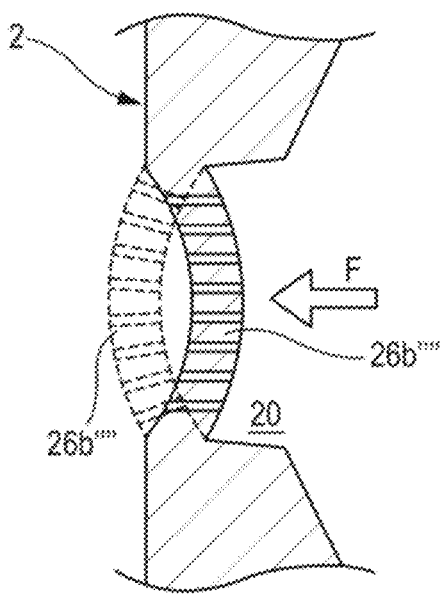

In FIG. 8, the drilled front wall 26*b*'''' is deformed temporarily and not definitively by the pressure of the fluid F present in the chamber 20. Once the pressure has fallen, the convex spray wall 26'''' returns to the configuration of the drilled front wall 26*b*''''.

Still in the context of the invention, the initial curvature can also be deformed in order to achieve a plane or even curved configuration, but to a lesser or greater degree.

It should also be noted that the nozzle of the invention does not need a swirl system to generate a spray.

By means of the invention, a single-piece nozzle can be made with a spray wall that is completely plane, or convex drilled with diverging holes that were drilled in parallel manner.

The invention claimed is:

1. A method of manufacturing a spray wall that is drilled with holes through which a pressurized fluid product passes so as to be sprayed in small droplets, the method comprising the following steps:

a—moulding in a mould a nozzle comprising a curved front wall and an assembly wall that are integrally formed, the assembly wall surrounding the curved front wall, the front wall having a curved initial configuration upon removal from the mould, wherein in the curved initial configuration the front wall is curved inwardly, b—drilling the curved front wall while the front wall is curved inwardly with a network of holes having a defined initial orientation, c—deforming the drilled curved front wall from the curved initial configuration into a final spray configuration defining a spray wall that is flat, the defined initial orientation of the holes being subsequently modified.

2. The method according to claim 1, wherein the front wall and the integrally assembly wall are made from a mouldable, deformable and drillable material.

3. The method according to claim 1, wherein, in step b—, the defined initial orientation of the holes is parallel.

4. The method according to claim 1, wherein, in step b—, the holes are drilled simultaneously with a divided laser beam.

5. The method according to claim 1, wherein step b-comprises drilling 10 to 500 holes having diameters lying in a range from 1 μm to 100 μm.

6. The method according to claim 1, wherein step b-comprises drilling 10 to 500 holes having diameters lying in a range from 5 μm to 30 μm.

7. The method according to claim 1, wherein step b-comprises drilling 10 to 500 holes having diameters lying in a range from 5 μm to 20 μm.

8. The method according to claim 1, wherein, in step c—, the deformation of the drilled curved front wall is permanent, made by means of a movable pin which comes into contact with the drilled curved front wall in order to push the curved front wall into the final spray flat configuration.

9. The method according to claim 8, wherein the movable pin and/or the drilled curved front wall are at an elevated temperature above ambient temperature at the time of their mutual contact.

10. The method according to claim 1, wherein, in step c—, the deformation of the drilled curved front wall is elastic and reversible.

11. The method according to claim 1, wherein the final spray configuration of the spray wall is substantially planar.

12. The method according to claim 1, wherein the spray wall is inserted into an assembly housing of a nozzle in a fluid dispenser head.

\* \* \* \* \*